United States Patent
Lee et al.

(10) Patent No.: US 8,265,564 B2
(45) Date of Patent: Sep. 11, 2012

(54) APPARATUS AND METHOD FOR TRANSMITTING DATA IN WIRELESS COMMUNICATION SYSTEM

(75) Inventors: Il-Gu Lee, Seoul (KR); Yun-Joo Kim, Suwon-si (KR); Hae-Young Na, Daejon (KR); Sok-Kyu Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 402 days.

(21) Appl. No.: 12/556,091

(22) Filed: Sep. 9, 2009

(65) Prior Publication Data

US 2010/0157893 A1    Jun. 24, 2010

(30) Foreign Application Priority Data

Dec. 18, 2008   (KR) .................. 10-2008-0129509

(51) Int. Cl.
*H04B 15/00* (2006.01)

(52) U.S. Cl. ..... 455/63.1; 370/242; 455/501; 455/114.2
(58) Field of Classification Search .............. 370/241, 370/242, 245, 252, 310, 328; 455/39, 42, 455/43, 501, 504, 63.1, 68, 69, 114.2, 115.1
See application file for complete search history.

(56) References Cited

U.S. PATENT DOCUMENTS

2005/0227645 A1* 10/2005 Sudo ..................... 455/127.2
2008/0049654 A1    2/2008 Otal et al.
2011/0069648 A1*  3/2011 Lee et al. ................ 370/310

OTHER PUBLICATIONS

MCCA: A High-Throughput MAC Strategyf for Next-Generation WLANs, IEEE Wireless Communicaitons . Feb. 2008, Seongkwan Kim and Sunghyun Choi.*
"MCCA: A High-Throughput MAC Strategy for Next-Generation WLANs", Seongkwan Kim et al., Wireless Communications, IEEE, vol. 15, Issue 1, pp. 32-39, Feb. 2008.
Il-Gu Lee et al., "Robust Wireless Transmission Utilizing PPDU-Based Aggregation Technique for Next Generation Wireless LANs", IEEE Communications Letters, vol. 14, No. 3, pp. 205-207, Mar. 2010.

* cited by examiner

*Primary Examiner* — Chi Pham
*Assistant Examiner* — Weibin Huang
(74) *Attorney, Agent, or Firm* — Kile Park Goekjian Reed & McManus PLLC

(57) ABSTRACT

Disclosed is an apparatus and method for transmitting data in a wireless communication system. The apparatus for transmitting a packet data in a wireless communication system includes a Media Access Control (MAC) layer for determining the number of preambles to be inserted based on a feedback reply signal from a receiver, and generating a multi-preamble aggregation packet by inserting the determined number of preambles into packets received from an upper layer and a physical layer for forming the multi-preamble aggregation packet generated in a data processing unit, by using a physical layer packet, and transmitting the formed multi-preamble aggregation packet.

17 Claims, 5 Drawing Sheets

APPARATUS AND METHOD FOR TRANSMITTING DATA IN WIRELESS COMMUNICATION SYSTEM

CROSS-REFERENCE TO RELATED APPLICATIONS

The present invention claims priority of Korean Patent Application No. 10-2008-0129509, filed on Dec. 18, 2008 which is incorporated herein by reference.

BACKGROUND OF THE INVENTION

1. Field of the Invention

The present invention relates to an apparatus and a method for transmitting data in a communication system; and, more particularly, to an apparatus and a method for transmitting data in a wireless communication system.

2. Description of Related Art

In general, a communication system is largely classified into a wired communication system and a wireless communication system. According to the wired communication system, since its connection between a terminal and a network is accomplished through a wire, stable and fast data transmission is possible but there is limitation in a user's activity range. On the contrary, according to the wireless communication system, data are transmitted using a predetermined frequency through a connection between a terminal and a network. As a result, the wireless communication system is relatively slow compared to the wired communication system but there is no limitation in the activity range of a user.

The packet-based high speed wireless communication systems are currently available in the wireless communication system due to the rapid development of techniques. Additionally, various techniques have been continuously studied. Furthermore, techniques, which are applied to channel conditions by controlling a transmission power, have been mainly used in order to effectively transmit data in a high speed. However, if these techniques are solely used, there are various limitations in increasing a packet transmission rate. Therefore, methods capable of increasing a packet transmission rate through more various techniques become necessary.

In order to meet these demands, methods capable of increasing a packet transmission rate through various techniques have been studied and introduced. The wireless communication system is mainly divided into a physical layer and a Media Access Control (MAC) layer. In the physical layer, complex techniques are used to improve a data rate and data transmission to a reliable level. A representative technique, which is usually used in the physical layer to constitute an ultra high-speed wireless communication system, includes a high speed wireless transmission method using a multiple antenna technology based on an orthogonal frequency division multiplexing, a channel encoding method, and a high dimensional modulation method. In addition, the MAC layer defines a certain protocol to provide high quality service to a user and mainly uses a Block acknowledgement (Ack) and aggregation mode technique, in order to provide a high throughput. The aggregation mode can transmit one long packet including connected several packets at once.

For example, according to Institute of Electrical and Electronics Engineers, Inc. (IEEE) 802.11n, which is an international double-balanced standard, a high dimensional modulation method of 64-QAM and a channel coding method having a high code rate and a ⅚code rate are introduced in the physical layer. Moreover, according to IEEE 802.11n, which is an internal wireless Local Area Network (LAN) standard, multiple antennas and a frequency orthogonal modulation method are applied to increase a physical layer data rate up to about 300 Mbps. Furthermore, in order to reduce an overhead caused by an interval between a header and a frame in the MAC layer, the Block Ack method and the aggregation mode are used to adopt a certain technique as a standard. According to the certain technique, a transmission rate of the MAC layer maintains a throughput up to the maximum value of about 200 Mbps if the physical layer rate is about 300 Mbps.

When IEEE, which is standards association of a wireless LAN, employs the Block Ack method and the aggregation mode for a MAC layer standard, a high throughput is theoretically possible. However, this throughput may not be possible in an actual wireless environment. The reason is that a signal is transmitted using the 64_QAM modulation method and ⅚ code rate through a multiple antenna, in order to achieve a throughput of more than about 180 Mbps. Therefore, a channel should be stable during a relatively long packet interval and a signal-to-noise ratio required in a receiver terminal must be maintained during the time interval in the wireless LAN system. Additionally, error propagation caused by tracking error should be relatively small in order to achieve a high throughput in the receiver terminal of the wireless LAN system.

An operation of the aggregation mode will be described below. First, when data to be transmitted are generated in a transmitter, the generated data constitute packets and then, one long packet including the predetermined number of packets is transmitted at one time. Once the data transmission is completed, a receiver demodulates and decodes the received one long packet and detects a reception error. When there is an error in the received one long packet, information about whether there are errors or not in a plurality of packets is notified to the transmitter at one time. When there is a packet having an error in the previously transmitted packets, the transmitter retransmits the same packet, thereby improving a reception success rate of a packet.

However, a retransmission time is one typical factor that deteriorates a throughput when a packet is transmitted. Therefore, in order to transmit data effectively, retransmission needs to be less basically. However, an actual channel has a lot of noise and has a frequency selective characteristic, and a long packet has a high packet error rate (PER) due to a time offset or frequency offset in a Radio Frequency (RF) and analog path. Thus, it is difficult to reach a throughput that can be theoretically obtainable in an ideal environment.

SUMMARY OF THE INVENTION

An embodiment of the present invention is directed to an apparatus and a method for transmitting a packet data applicable to a channel condition in a wireless communication system.

Another embodiment of the present invention is directed to an apparatus and a method for transmitting data capable of providing a high throughput in a wireless communication system of an aggregation mode.

In accordance with an aspect of the present invention, there is provided an apparatus for transmission of a packet data in a wireless communication system including a Media Access Control (MAC) layer for determining the number of preambles to be inserted based on a feed-back reply signal from a receiver, and generating a multi-preamble aggregation packet by inserting the determined number of preambles into packets received from an upper layer and a physical layer for forming the multi-preamble aggregation packet generated in a data processing unit, by using a physical layer packet, and transmitting the formed multi-preamble aggregation packet.

In accordance with another aspect of the present invention, there is provided a method for transmitting of a packet data in a wireless communication system including a process to determine the number of preambles to be inserted in a multi-preamble aggregation packet based on a feed-back reply signal from a receiver, to generating the multi-preamble aggregation packet by inserting the determined number of preambles into packets received from an upper layer, and to transmitting the generated multi-preamble aggregation packet.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The present invention will be described with reference to the accompanying drawings. During a description of the present invention, a portion apparent to those skilled in the art will be omitted for conciseness. Additionally, each term used hereinafter is merely used for helping understand the present invention. However, even if the above term is used for the same purpose, another different term may be used in each manufacturing company or research group.

Figure 1:
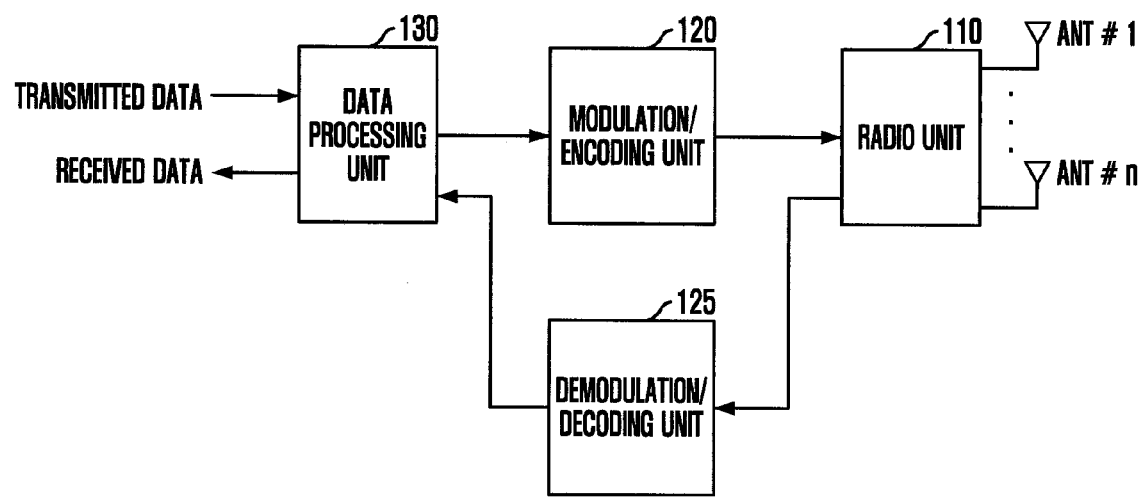
FIG. 1 is a functional block diagram of a wireless communication device to which the present invention is applied.

FIG. 1 is a functional block diagram of a wireless communication device to which the present invention is applied. Functions of the wireless communication device in accordance with the present invention will be described with reference to FIG. 1.

First, a case of when the wireless communication device operates as a transmitter will be described. Transmission data to be transmitted, which are generated in the transmitter, are transmitted from an upper layer to a data processing unit 130. The data processing unit 130 may be a Media Access Control (MAC) layer. The data processing unit 130 forms one long packet with a plurality of packets to be transmitted and then transfers it to a modulation/encoding unit 120 when packet data are transmitted in an aggregation mode. Then, the modulation/encoding unit 120 performs a modulation and encoding process on the received one long packet. Here, the modulation/encoding unit 120 may be a physical layer. the packet modulated and encoded in the modulation/encoding unit 120 is matched according to a predetermined wireless transmission method, and is up-converted to be transmitted to a receiver through antennas ANT #1, . . . , ANT #n. Here, a radio unit 110 and the antennas ANT #1, . . . , ANT #n may be the physical layer.

Once a reply signal is received from the receiver through a Block acknowledgement (Ack) method, the transmitted data are down-converted and de-mapped in the radio unit 110. The signals on which the down-conversion and de-mapping process are performed are inputted into the demodulation/decoding unit 125. The demodulation/decoding unit 125 demodulates/decodes the received reply signal through the received Block Ack method, and then provides the demodulated/decoded reply signal into the data processing unit 130. Then, the data processing unit 130 extracts information about error packets from the received reply signal and then, lengthens or shortens an insertion period of a preamble in an aggregation packet, based on a generated error distribution and frequency. If necessary, the data processing unit 130 reduces the number or amount of the aggregation packets. In description below, an aggregation packet where the number of preambles is increased or decreased is called a multi-preamble aggregation packet.

In general, since the fact that errors occur frequently means that a change of a channel is severely made, more preambles may be inserted. Additionally, since the fact that errors do not occur frequently means that a channel is stable, a control is performed to reduce the inserting of a preamble. Moreover, if there are errors concentrated on the last packet, a transmission amount of an aggregation packet or the number of packets is reduced and then, the packet is transmitted. A more detailed operation for this will be described with reference to FIG. 2.

Next, a case of when the wireless communication device operates as a receiver will be described. An aggregation packet transmitted from the transmitter is inputted into the radio unit 110 through a plurality of antennas ANT #1, . . . , ANT #n, and a channel is estimated through a preamble. At this point, in a case of the aggregation packet according to the present invention, the radio unit 110 estimates a channel from a plurality of preambles in the aggregation packet and then, provides estimated channel to the demodulation/decoding unit 125. Then, the demodulation/decoding unit 125 performs a demodulation/decoding operation through a channel estimation value. When the demodulation/decoding operation is performed on the received packet, a channel situation can be continuously estimated from the number of preambles of which number is more than the number of aggregation packets. Therefore, the demodulating and decoding of a packet becomes more efficient. The packets where the demodulation and decoding operation are completed are provided to the data processing unit 130. The data processing unit 130 detects whether there is an error or not by examining the received packets. If there is no error, the data processing unit 130 delivers the data to the upper layer.

On the contrary, if there is an error, the data processing unit 130 generates a reply signal through a Block Ack method, and then delivers it to the modulation/encoding unit 120. Accordingly, the modulation/encoding unit 120 modulates and encodes the reply signal through a predetermined method. The modulated and encoded signal is converted into a signal of a transmission band in the radio unit 110 and then the converted signal is transmitted to the receiver through the respective ANT #1, . . . , ANT #n.

Figure 2:
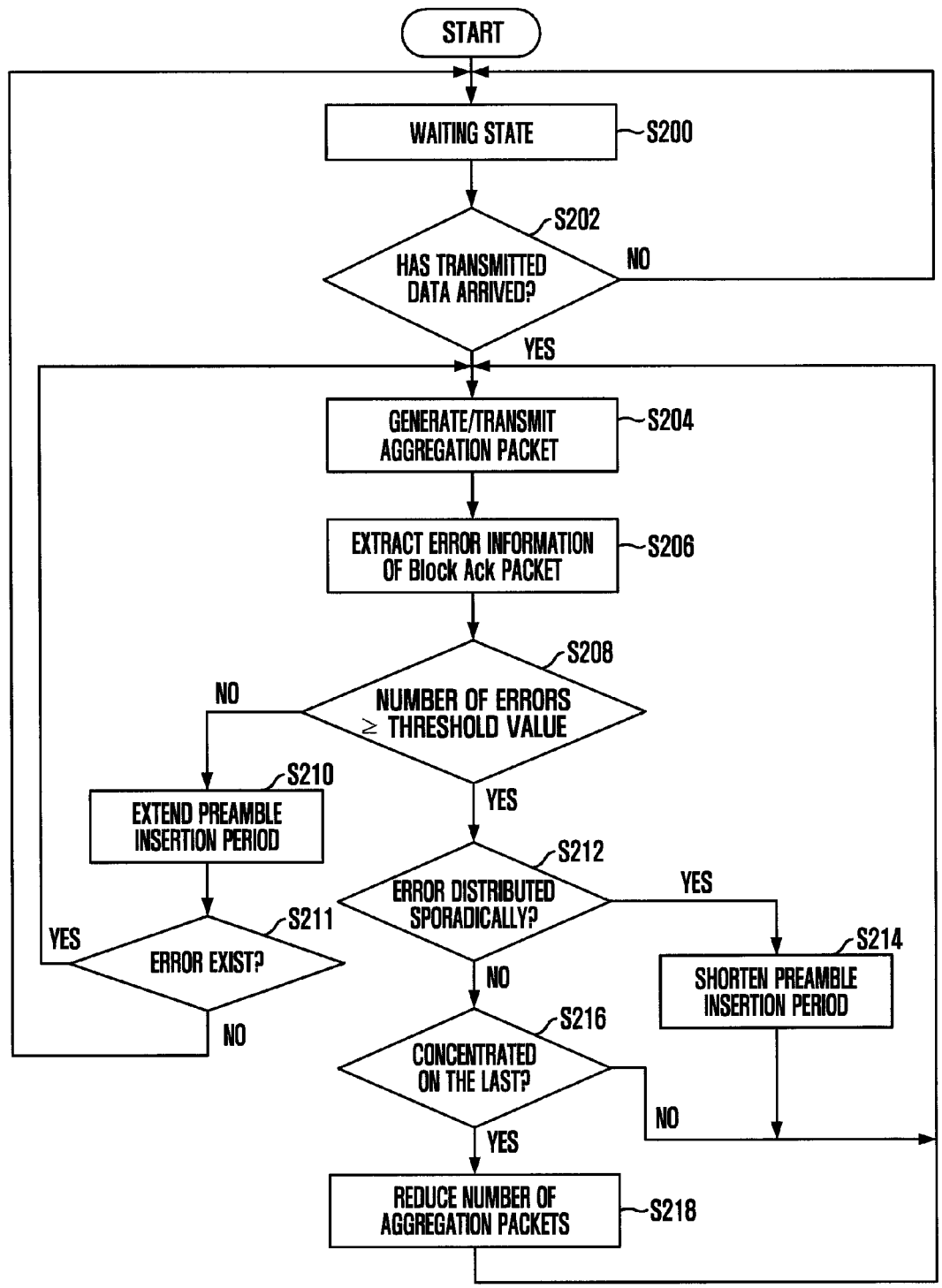
FIG. 2 is a control flowchart when a packet is transmitted in the data processing unit in accordance with the present invention.

FIG. 2 is a control flowchart when a packet is transmitted in the data processing unit in accordance with the present invention.

The data processing unit 130 maintains a waiting state in step S200. The waiting state typically means a state for waiting transmission and reception of data, i.e., waiting a packet transmitted from an upper layer and waiting a reply packet or a reply signal from a physical layer. Since the present invention is related to transmission of packet data, a state for waiting reception of data to be transmitted is assumed and will be described.

The data processing unit 130 maintains the waiting state of the step S200 and proceeds to step S202 when a specific event occurs and then detects whether a packet to be transmitted arrives or not. This event is divided into a case where a packet to be transmitted arrives from an upper layer and a case where there is a retransmission packet when an error is detected through the Block Ack method. The case where a packet to be transmitted arrives from the upper layer will be described with reference to FIG. 2. When a packet to be transmitted arrives according to a test result of the step S202, the packet data processing unit 130 proceeds to step S204 to generate an aggregation packet through a plurality of packets to be transmitted, and then transmits the generated aggregation packet to the physical layer. The generating of the aggregation packet may be an aggregation packet according to Institute of Electrical and Electronics Engineers, Inc. (IEEE) 802.11n standard or may be a multi-preamble aggregation packet according to the present invention.

After that, when the data processing unit 130 receives the Block Ack packet through the radio unit 110 and the demodulation/decoding unit 125, it extracts error information from the received Block Ack packet in step S206. That is, after the generating of the aggregation packet through a plurality of packets, it is detected that there are transmission errors or not in a certain packet among the transmitted packets. After the detecting of the transmission errors, the data processing unit 130 proceeds to step S208, and detects whether the number of generated errors is more than a predetermined threshold value or not. This threshold value can be obtained with the most optimized value through experiment, or with the most optimized threshold value in the aggregation mode, in order to prepare a case of transmitting data by setting an aggregation mode and a case of a typical transmission mode.

If the number of errors is less than the predetermined threshold value, the data processing unit 130 proceeds to step S210 and then lengthens a preamble insertion period. That is, the preamble is inserted less. That is, after the determining of the preamble insertion period, the data processing unit 130 stores information related to the preamble insertion period, and then proceeds to step S211. In the step S211, it is detected where there is a packet having a received error among the transmitted packets through the error information extracted from the Block Ack packet about the transmitted aggregation packet. If there is an error packet among the previously transmitted packets, the data processing unit 130 proceeds to the step S204, and generates an aggregation packet for retransmission in accordance with the predetermined preamble insertion period and then transmits the generated aggregation packet. However, if there is no error packet in the previously transmitted aggregation packet, the data processing unit 130 proceeds to the step S200.

If the number of packets having errors among the previously transmitted aggregation packets is more than the threshold value according to the test result of the step S208, the data processing unit 130 proceeds to step S212, and then detects where packet errors are distributed sporadically. If the packet errors are distributed sporadically, it means that a state of a channel is highly fluid. Since the channel is drastically changed according to time, it is impossible to adequately detect a drastically-changing channel in one long packet through one or the small number of preambles. Accordingly, if the packet errors are distributed sporadically, the data processing unit 130 proceeds to step S214, shortens the preamble insertion period and stores the shortened preamble insertion period, and then proceeds to the step S204. The shortening of the preamble insertion period results in the inserting of the more number of preambles. If the preambles are inserted more, channel estimation becomes easier in the receiver and thus a packet is more effectively demodulated and decoded. Therefore, reception performance of a packet, that is, an entire throughput, can be improved. After the determining of the preamble insertion period, it proceeds to the step S204. Then, the data processing unit 130 generates an aggregation packet with packets having errors through the newly applied preamble insertion period and then transmits the generated aggregation packet to the physical layer. Through this, a packet can be transmitted more effectively.

If the errors are not distributed sporadically according to the test result of the step S212, the data processing unit 130 proceeds to step S216 and then examines whether there are errors concentrated on the last packets or not. The test of the step S216 is to determine the number of packets that is used for constituting an aggregation packet. That is, if an aggregation packet is generated with too many packets, an error may be concentrated on the last packets. Thus, this operation is for determining the number of packets that is used for constituting the aggregation packet. If errors are concentrated on the last packet according to the test result of the step S216, the data processing unit 130 proceeds to step S218 to reduce the number of the aggregation packets and store the number. Then, the data processing unit 130 proceeds to the step S204 to constitute a retransmission packet for retransmitting the packets having errors.

If the above-mentioned method of FIG. 2 is examined in general, it is as follows. In accordance with the above-mentioned method, a packet is aggregated and is transmitted at a transmission interval, and also a packet having an error among the aggregated and transmitted packets is selectively retransmitted. When a packet is aggregated again in the next time, an interval for inserting a preamble into the middle of the aggregation packet is determined based on transmission failure information through the immediately previous aggregation packet. At this point, the failure information is obtained using error packet information of the Block Ack packet. The receiver newly updates a channel estimation value through the preamble inserted in the middle of the aggregation packet. Like this, by simply inserting the preamble in the transmitter, the channel estimation value of the receiver can be improved. Additionally, if a change of a channel is very severe during transmitting of a long aggregation packet, this method becomes more effective. However, the preamble insertion means that an overhead is increased in terms of the MAC. Therefore, it is necessary to find the preamble insertion interval for the optimized throughput. For this, error packet information of the Block Ack is utilized. That is, if there are many errors, the preamble insertion interval is shortened and if there are a few errors, the preamble insertion interval is lengthened, in order to improve a throughput.

At this point, based on the error packet information of the Block Ack packet, if an error packet count value is more than a predetermined threshold value, the preamble insertion period is shortened and if an error packet count value is less than the predetermined limitation value, the preamble insertion period is lengthened, in order to improve a throughput. Additionally, if distribution of the error packet information for the Block Ack packet is concentrated on the last portion of the aggregation packet, the reducing of the number of aggregated packets allows for the next aggregation packet to generate less error.

Figure 3:
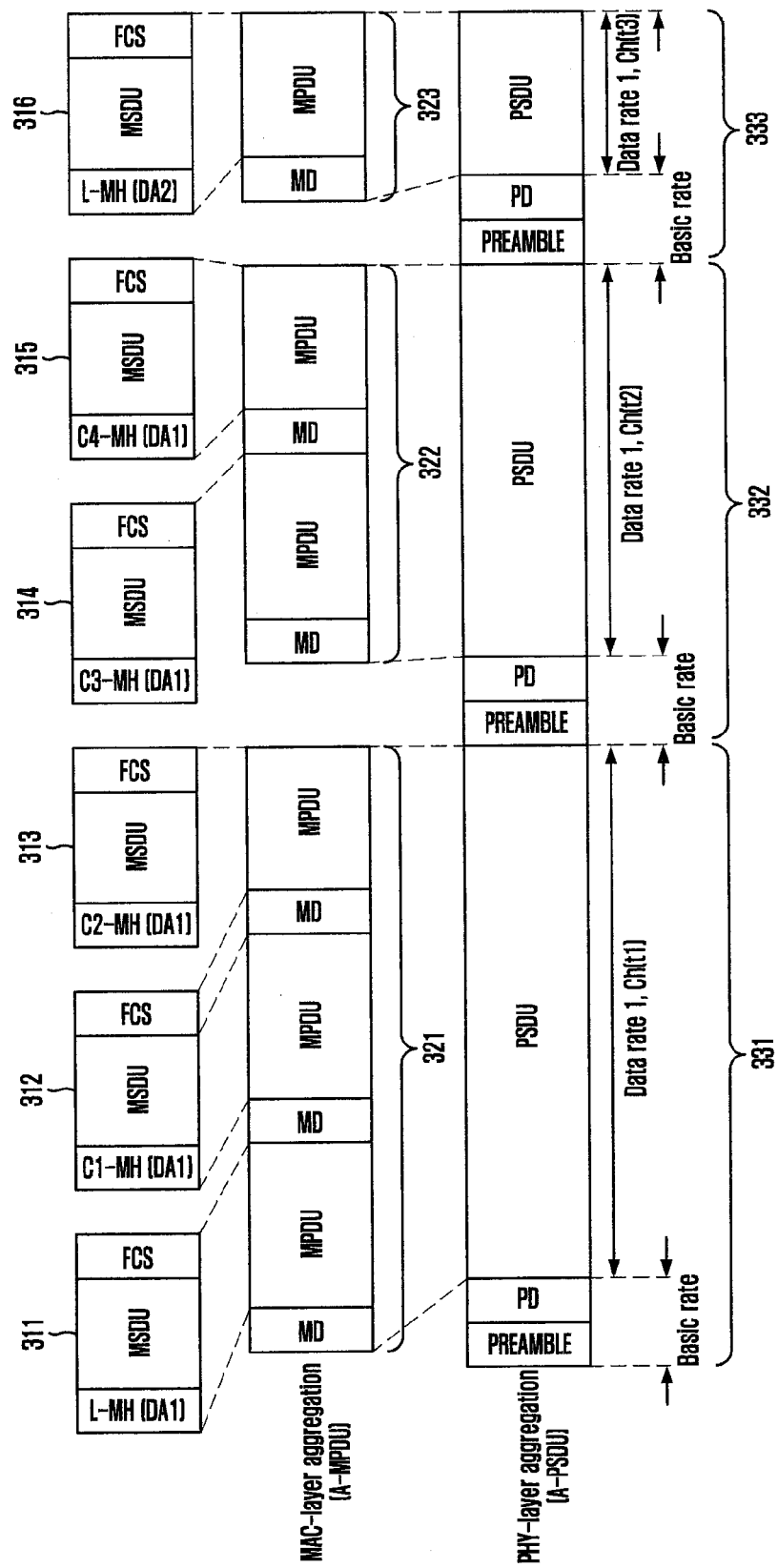
FIG. 3 is a diagram of a multi-preamble aggregation packet in accordance with an embodiment of the present invention.

FIG. 3 is a diagram of a multi-preamble aggregation packet in accordance with an embodiment of the present invention. Referring to FIG. 3, the diagram of a multi-preamble aggregation packet in accordance with an embodiment of the present invention will be described. Additionally, the data processing unit 130 will be described below with an MAC layer, and the modulation/encoding unit 129 and the radio unit 110 will be described with a physical layer.

First, a plurality of SDUs 311, 312, 313, 314, 315, and 316 are received from an upper layer to a MAC layer. The Service Data Unit is referred as SDU in FIG. 3. The SDUs 311, 312, 313, 314, 315, and 316 include headers and Frame Check Sequences (FCSs) for a Cyclic Redundancy Check (CRC) test. In the MAC layer, a Packet Data Unit (PDU) is constituted through each SDU. In FIG. 3, the PDU is represented with MPDU, and each MPDU includes a header. In the MAC layer, an aggregation packet of the MAC layer is constituted through the MPDUs. That is, in accordance with an embodiment of FIG. 3, an aggregation packet 321 of the first MAC layer includes MSDUs 311, 312, and 313. An aggregation packet of the second MAC layer includes two MSDUs 314 and 315. An aggregation packet 323 of the third MAC layer includes one MSDU 316. Each of the MAC layer aggregation packets 321, 322, and 323 includes a preamble and a header of the physical layer and includes the aggregation packets 331, 332, and 333 of the physical layer. The preambles and the headers of the aggregation packets 331, 332, and 333 in the physical layer are transmitted in a basic rate, and the aggregation packets 331, 332, and 333 are transmitted through the respectively corresponding data transmission rates.

Figure 4:
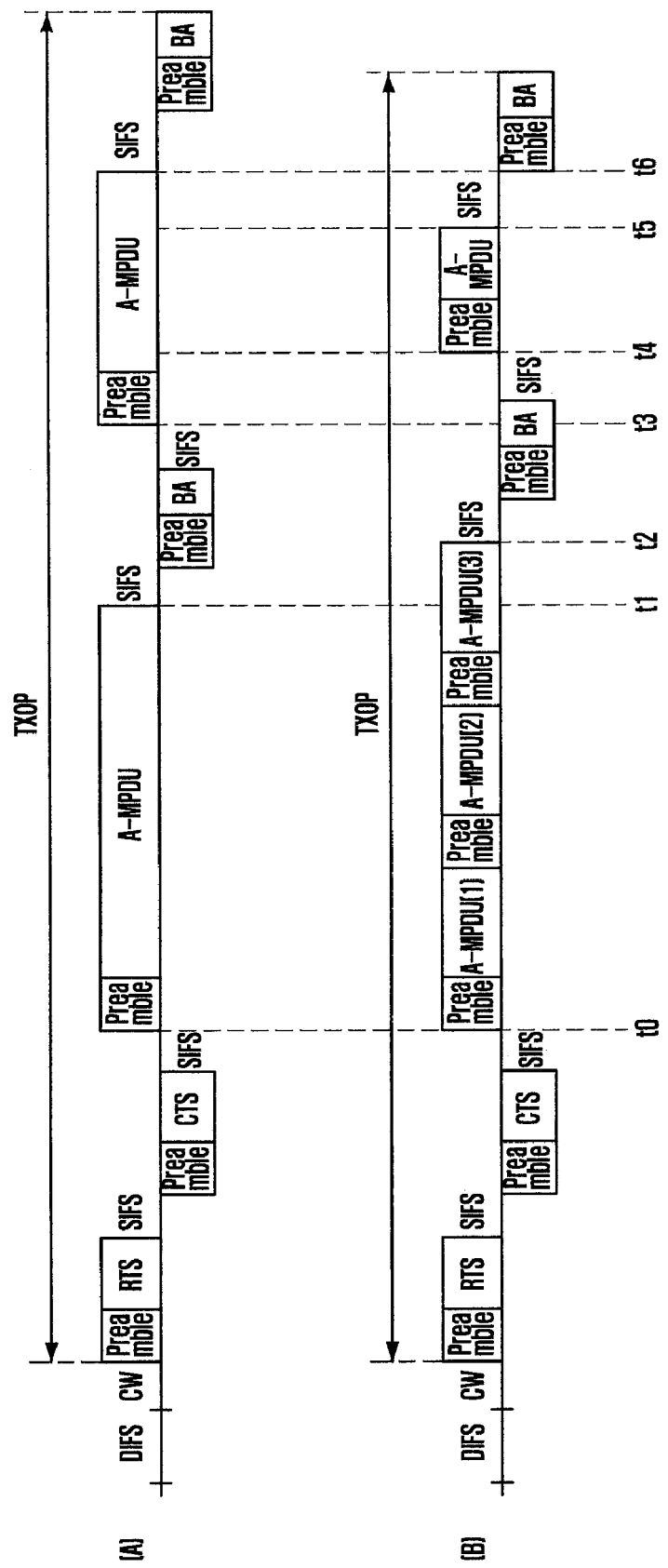
FIG. 4 is a timing diagram used for comparing transmission between a multi-preamble aggregation method of the present invention to a typical aggregation method.

FIG. 4 is a timing diagram used for comparing transmission between a multi-preamble aggregation method of the present invention to a typical aggregation method. A timing diagram in (A) of FIG. 4 represents a transmission method in accordance with the typical aggregation method. A timing diagram in (B) of FIG. 4 represents a transmission method in accordance with the multi-preamble aggregation method of the present invention.

Referring to FIG. 4, all aggregation packets are transmitted at a point of t0. However, since there is only one preamble in the aggregation mode, a typical aggregation transmission time becomes shortened. However, in accordance with the multi-preamble aggregation method of the present invention, since there is at least one preamble, the aggregation packet is transmitted until a point of t2. In (b) of FIG. 4, there are three preambles. Once transmission is completed like above, there may be a relative loss at an initial transmission time, but retransmission will be decreased. That is, since it is difficult to distinguish between a case of when a channel change is severe and a case of when a channel change is not severe, even if there is a severe channel change, a packet is transmitted through the same method. However, when the method in accordance with the present invention is applied, it is possible to detect a channel change through the feed-back Block Ack from the receiver and through this, an initial transmission time may be lengthened but an actual retransmission is decreased. That is, in a case of the typical aggregation mode, a retransmission starting point is t3, and a completion point of the retransmission becomes t6.

However, if a channel change is severe in the multi-preamble aggregation mode, retransmission is started at a point of t4, but a time for completing the retransmission becomes shortened actually, for example, a point of t5.

Hereafter, a case where the effects of the above-mentioned multi-preamble aggregation mode in accordance with the present invention is applied to an IEEE 802.11n standard system will be described.

Figure 5:
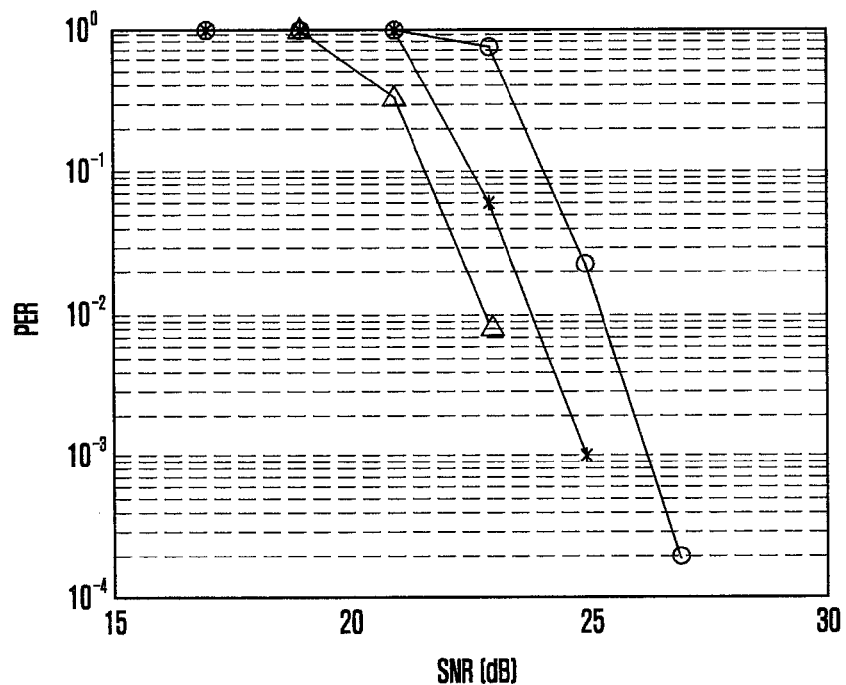
FIG. 5 is a graph for simulating characteristics between a packet error rate (PER) and a signal-to-noise ratio during packet transmission.

FIG. 5 is a graph for simulating characteristics between a packet error rate and a signal-to-noise ratio during packet transmission.

When 40 MHz is used in the physical layer, a 2×3 Multiple Input Multiple Output (MIMO)-Orthogonal Frequency Division Multiplexing (OFDM) technique is used in a bandwidth, and 64-QAM modulation and 5/6 code rate channel coding are used, a data rate can be increased up to 400 Mbps. At this point, if the Block Ack and the aggregation technique are used in the MAC layer, when forty 1000-byte packets are aggregated, the maximum throughput of about 210 Mbps can be obtained in the MAC layer. However, this is a case where there is no channel change and noise is small. However, the actual channel changes all the time and also noise is severe. FIG. 5 shows results of simulating respective PERs of packets of 1000, 10000, and 40000 bytes. 'o', '*', 'Δ' represent 40000 byte, 10000 byte, and 1000 byte, respectively. As shown in the simulation result of FIG. 5, in a case of the 40000 byte packet, errors almost occur below 23 dB. Additionally, in a case of the 10000 byte packet, an error occurs below 21 dB, and in a case of the 1000 byte packet, an error almost occurs at 19 dB. Additionally, Signal-to-Noise Ratio (SNRs) for 10% PER are 21.5 dB, 22.5 dB, and 24.5 dB, respectively. As shown in this experimental result, an interval between 20 dB and 25 dB is a SNR interval where performance of PER drastically changes from 100% to 1%, and under these circumstance, it is apparent that the length of packet is a pretty important factor to its performances. For example, in a case of SNR of 23 dB, the 1000 byte packet has 1% PER, but the 40000 byte packet has 95% PER. That is, there is a huge difference.

Figure 6:
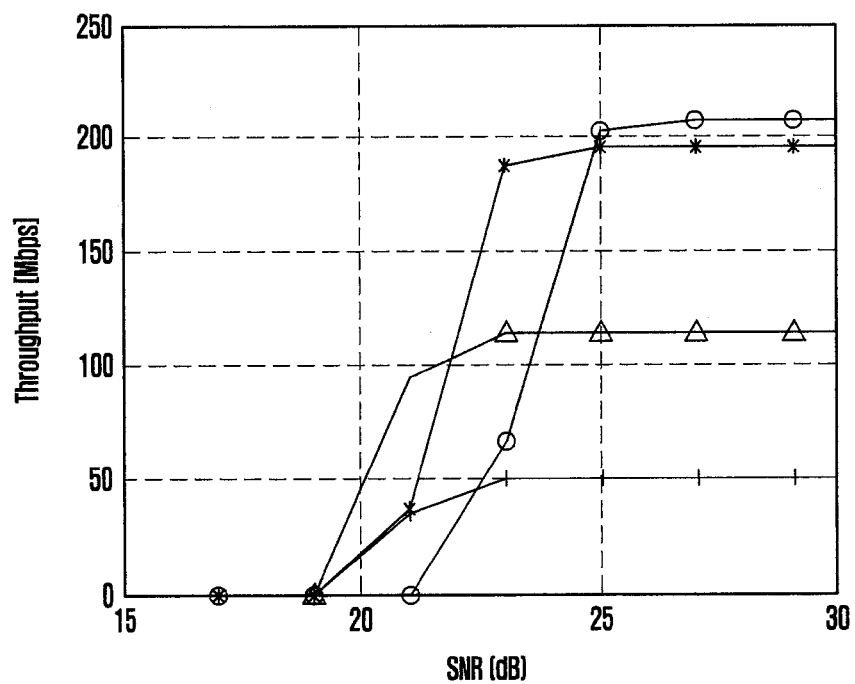
FIG. 6 is a simulation result graph illustrating a throughput performance according to a signal-to-noise ratio and a preamble insertion period.

FIG. 6 is a simulation result graph illustrating a throughput performance according to a signal-to-noise ratio and a preamble insertion period. In FIG. 6, 'o', '*', 'Δ' uses 1, 4, and 40 preambles, respectively. An aggregation packet having the total length of a 40000 byte packet is used in the simulation graph. Additionally, in FIG. 6, '+' is a case where Normal Ack of a typical 1000 byte packet is used. According to the graph of FIG. 6, when a signal-to-noise ratio is more than 25 dB, one preamble is used. When a signal-to-noise ratio is between 22 dB and 25 dB, four preambles are used. When a signal-to-noise ratio is between 20 dB and 22 dB, forty preambles are used. All those cases are beneficial for the throughput performance. The reason that the Normal Ack packet has only a throughput of 18% compared to a data rate of the physical layer is due to an increases of a preamble, which is caused through an interval between packets at each packet, an Ack packet, and a preamble of a physical layer. However, this case is advantageous in responding to a channel change fast compared to an aggregation packet because each of 1000 byte packets uses a preamble. In an aspect of a throughput, according to a case of an aggregation packet, when a preamble is inserted at each 1000 byte packet, which is up to a point where a throughput of 'Δ' is higher than that of '+', aggregation is effective. While considering a requested signal-to-noise ratio, compared to a Normal Ack 1000 byte, a signal-to-noise ratio for outputting a 50 Mbps throughput is lowered by about 3 dB when a preamble is inserted at each 1000 byte through aggregation. Therefore, aggregation is still effective.

If the device of the present invention is not used, when a channel situation becomes worse below a predetermined signal-to-noise ratio, a throughput is decreased. However, the channel adaptive packet generating device and a channel estimation value updating method are used in accordance with the present invention to obtain performance improvement of about 5 dB in terms of SNR and 50~70 Mbps in terms of throughput.

Next, an analysis about how far improvement of a throughput efficiency of the MAC using the present invention is obtained can be calculated by Equation 1.

$$Throughput = \frac{L_{payload}}{T_{total}} \quad \text{Eq. 1}$$

The throughput of Equation 1 is a value obtained by dividing the length of the transmitted data payload by a time consumed for transmission. At this point, the time for transmitting data includes a time for transmitting an overhead having an interval between packets, a header, and a preamble and data. This will be expressed as Equation 2.

$$T_{total} = T_{DIFS} + CW + T_{pre} + T_{RTS} + T_{SIFS} + T_{pre} + T_{CTS} + \\ T_{SIFS} + T_{pre} + T_{A-MPDU} T_{SIFS} + T_{pre} + T_{BA} + T_{SIFS} + \\ T_{pre} + T_{A-MPDU} + T_{SIF} + T_{pre} + T_{BA} \quad \text{Eq. 2}$$

The throughput efficiency of the MAC layer can be expressed as Equation 3, based on Equation 1 and Equation 2.

$$MAC efficiency = \frac{MAC Throughput}{PHY rate} \quad \text{Eq. 3}$$

The above Equation 3 calculates a value that is obtained by dividing the throughput of the MAC layer by the data rate of the physical layer. For example, when forty 1000 byte packets are aggregated and a 40000 byte packet is transmitted, an aggregation packet is transmitted as it is according to a typical technique. Thus, A-MPDU(40000) is transmitted and then a 10 packet group A-MPDU(10000) having an error is retransmitted. In this case, the time is calculated by Equation 4.

$$T_{total} = T_{DIFS} + CW + T_{pre} + T_{RTS} + T_{SIFS} + T_{pre} + T_{CTS} + \\ T_{SIFS} + T_{pre} + T_{A-MPDU(40000)} T_{SIFS} + T_{pre} + T_{BA} + \\ T_{SIFS} + T_{pre} + T_{A-MPDU(40000)} + T_{SIF} + T_{pre} + T_{BA} \quad \text{Eq. 4}$$

However, in accordance with the present invention, as expressed in Equation 5, the preamble is inserted at each four A-MPDU(10000), and then is transmitted.

$$T_{total} = T_{DIFS} + CW + T_{pre} + T_{RTS} + T_{SIFS} + T_{pre} + T_{CTS} + \\ T_{SIFS} + T_{pre} + T_{A-MPDU(10000)} + T_{pre} + \\ T_{A-MPDU(10000)} + T_{pre} + T_{A-MPDU(10000)} + T_{pre} + \\ T_{A-MPDU(10000)} T_{SIFS} + T_{pre} + T_{BA} + T_{SIFS} + T_{pre} + \\ T_{A-MPDU(10000)} T_{SIF} + T_{pre} + T_{BA} \quad \text{Eq. 5}$$

Accordingly, if an aggregation packet is transmitted through Equation 5, only one packet needs to be retransmitted because it is well adaptive to a channel change. Therefore, only the A-MPDU(1000) is retransmitted. As a result, in accordance with this example, if data corresponding to 9000 byte are transmitted by inserting three preambles (32 us×3) through a 64 QAM and ⅚ code rate modulation method at 40 MHz bandwidth and 2×3 MIMO. A gain of about 250 μs can be obtained in terms of time.

According to the technique of the present invention, based on a channel circumstance, a physical preamble is inserted into the optimized position of the throughput during an aggregation packet formation. Therefore, the throughput can be improved in an actual wireless channel environment where noise and channel change are severe.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting a packet data in a wireless communication system, comprising:
   a Media Access Control (MAC) layer for determining the number of preambles to be inserted based on packet error information in a feed-back reply signal from a receiver, and generating a multi-preamble aggregation packet by inserting the determined number of preambles into packets received from an upper layer; and
   a physical layer for forming the multi-preamble aggregation packet generated in a data processing unit, by using a physical layer packet, and transmitting the formed multi-preamble aggregation packet.

2. The apparatus of claim 1, wherein the physical layer comprises:
   a modulation/encoding unit modulating and encoding the multi-preamble aggregation packet; and
   a radio unit converting a modulated and encoded packet into a radio signal of a transmission band and transmitting the converted radio signal through an antenna.

3. The apparatus of claim 1, wherein the reply signal is a Block Acknowledgement (Ack) signal.

4. The apparatus of claim 1, wherein the MAC layer examines the number of packets having errors from a reply signal corresponding to the transmitted multi-preamble aggregation packet, and lengthens a preamble insertion period when the number of packets having errors is less than a predetermined threshold value.

5. The apparatus of claim 1, wherein the MAC layer examines the number of packets having errors from a reply signal corresponding to the transmitted multi-preamble aggregation packet, and reduces the number of MAC layer packets to be included in a second multi-preamble aggregation packet when the number of packets having errors is more than a predetermined threshold value and there are errors concentrated in the last one or more packets in the transmitted multi-preamble aggregation packet.

6. The apparatus of claim 1, wherein the MAC layer examines the number of packets having errors from a reply signal corresponding to the transmitted multi-preamble aggregation packet, and shortens a preamble insertion period when the number of packets having errors is more than a predetermined threshold value and there are sporadically-distributed errors in the transmitted multi-preamble aggregation packet.

7. The apparatus of claim 1, wherein the transmitted multi-preamble aggregation packet comprises at least two preambles separated by an A-MPDU.

8. The apparatus of claim 1, wherein the MAC layer examines the number of packets having errors from a reply signal corresponding to the transmitted multi-preamble aggregation packet, and lengthens a preamble insertion period when the number of packets having errors is less than a predetermined threshold value;
   wherein the MAC layer generates a second multi-preamble aggregation packet, and wherein the physical layer forms the second multi-preamble aggregation packet, and transmits the formed second multi-preamble aggregation packet; and
   wherein the MAC layer examines a second number of packets having errors from a second reply signal corresponding to the transmitted second multi-preamble aggregation packet, and shortens the preamble insertion period when the second number of packets having errors is greater than or equal to the predetermined threshold value and there are sporadically-distributed errors in the transmitted second multi-preamble aggregation packet.

9. The apparatus of claim 1, wherein the MAC layer examines the number of packets having errors from a reply signal corresponding to the transmitted multi-preamble aggregation packet, and increases the number of preambles to be inserted in a second multi-preamble aggregation packet when the number of packets having errors is greater than or equal to a predetermined threshold value.

10. A method for transmitting a packet data in a wireless communication system, comprising:
   determining the number of preambles to be inserted in a multi-preamble aggregation packet based on packet error information in a feed-back reply signal from a receiver; and
   generating the multi-preamble aggregation packet by inserting the determined number of preambles into packets received from an upper layer, and transmitting the generated multi-preamble aggregation packet.

11. The method of claim 10, wherein the reply signal is a Block Acknowledgement (Ack) signal.

12. The method of claim 10, further comprising:
   examining the number of packets having errors from a reply signal corresponding to the transmitted multi-preamble aggregation packet; and
   lengthening a preamble insertion period when the number of packets having errors is less than a predetermined threshold value.

13. The method of claim 10, further comprising:
   examining the number of packets having errors from a reply signal corresponding to the transmitted multi-preamble aggregation packet; and
   reducing the number of MAC layer packets to be included in a second multi-preamble aggregation packet when the number of packets having errors is more than a predetermined threshold value and there are errors concentrated in the last one or more packets in the transmitted multi-preamble aggregation packet.

14. The method of claim 10, further comprising:
   examining the number of packets having errors from a reply signal corresponding to the transmitted multi-preamble aggregation packet; and
   shortening a preamble insertion period when the number of packets having errors is more than a predetermined threshold value and there are sporadically-distributed errors in the transmitted multi-preamble aggregation packet.

15. The method of claim 10, wherein the transmitted multi-preamble aggregation packet comprises at least two preambles separated by an A-MPDU.

16. The method of claim 10, further comprising:
   examining the number of packets having errors from a reply signal corresponding to the transmitted multi-preamble aggregation packet;
   lengthening a preamble insertion period when the number of packets having errors is less than a predetermined threshold value;
   generating a second multi-preamble aggregation packet, and transmitting the second multi-preamble aggregation packet;
   examining a second number of packets having errors from a second reply signal corresponding to the transmitted second multi-preamble aggregation packet; and
   shortening the preamble insertion period when the second number of packets having errors is greater than or equal to the predetermined threshold value.

17. The method of claim 10, further comprising:
   examining the number of packets having errors from a reply signal corresponding to the transmitted multi-preamble aggregation packet; and
   inserting more preambles in a second multi-preamble aggregation packet, as compared to the transmitted multi-aggregation packet, when the number of packets having errors is greater than or equal to a predetermined threshold value.

* * * * *